United States Patent [19]

Shinmura et al.

[11] Patent Number: 5,532,316

[45] Date of Patent: Jul. 2, 1996

[54] METHOD FOR PRODUCING A MOLDED HEAT-RESISTANT RESIN PRODUCT

[75] Inventors: Tetsuya Shinmura; Kunihiko Konishi, both of Ichihara, Japan

[73] Assignee: Denki Kagaku Kogyo Kabushiki Kaisha, Tokyo, Japan

[21] Appl. No.: 433,018

[22] Filed: May 3, 1995

[30] Foreign Application Priority Data

May 24, 1994 [JP] Japan ................................ 6-110012

[51] Int. Cl.6 ..................................................... C08L 51/04
[52] U.S. Cl. ......................................... 525/71; 525/73
[58] Field of Search .......................................... 525/71, 73

[56] References Cited

U.S. PATENT DOCUMENTS 4,404,322  9/1983  Saito et al. .

4,994,515  2/1991  Washiyama ............................ 524/269

FOREIGN PATENT DOCUMENTS 632912  2/1994  Japan .

OTHER PUBLICATIONS

Patent Abstracts of Japan, vol. 18, No. 251 (C–1199), May 13, 1994, JP-A-06 032912, Feb. 8, 1994.

*Primary Examiner*—Vasu S. Jagannathan
*Attorney, Agent, or Firm*—Oblon, Spivak, McClelland, Maier & Neustadt

[57] ABSTRACT

A method for producing a molded heat-resistant resin product, which comprises injection-molding a thermoplastic resin (A) and a rubber-reinforced heat-resistant resin (B) having a high temperature side glass transition temperature, the difference of which from the high temperature side glass transition temperature of said thermoplastic resin (A) is within 60° C., simultaneously as they are.

4 Claims, No Drawings

METHOD FOR PRODUCING A MOLDED HEAT-RESISTANT RESIN PRODUCT

The present invention relates to a method for producing a molded heat-resistant resin product, whereby a molded product of a heat-resistant resin such as heat-resistant ABS resin can easily be obtained. The method of the present invention is applicable for the production of molded products in various fields such as automobile parts, electric and electronic parts, household electric parts and sundries, in which heat-resistant ABS resin or the like has been used.

As a means to improve the heat-resistance of ABS resin, a method has been known in which a heat-resistant copolymer having high heat resistance and being miscible with the ABS resin, such as an α-methylstyrene-acrylonitrile copolymer, a styrene-maleic anhydride copolymer, a styrene-N-phenylmaleimide copolymer or a styrene-N-phenylmaleimide-acrylonitrile copolymer, is kneaded and mixed to the ABS resin. To knead and mix such a heat-resistant copolymer to the ABS resin, it has been common to employ a kneader such as a single screw extruder, a twin screw extruder or a Banbury mixer to obtain resin pellets having desired heat resistance and other properties and to shape the obtained resin pellets by such a mean as injection molding to obtain a molded product.

Such a conventional method has the following three main drawbacks. The first drawback is that to obtain molded products having various different levels of heat-resistance, different resin pellets are required which correspond to the respective levels of heat-resistance, whereby control of various types of materials is cumbersome. The second drawback is that the resin, especially the ABS resin, tends to deteriorate during the kneading operation, whereby the impact strength tends to be low. The third drawback is that the kneading operation requires a substantial cost, whereby the method is economically disadvantageous.

It is an object of the present invention to overcome the above mentioned three main drawbacks simultaneously. Namely, the present invention is directed to a method for producing a molded product which comprises molding ABS resin and a certain specific heat-resistant resin simultaneously as they are by an injection molding machine. According to the method of the present invention, by changing the blend ratio of the specific heat-resistant resin to the ABS resin, molded products having various desired levels of heat resistance and desired other physical properties can easily be obtained by an injection molding machine without necessity of a kneading operation by an extruder or the like, whereby it is unnecessary to have various resin materials corresponding to various required physical properties. Further, the method does not require a kneading operation by an extruder or the like and hence involves little heat history, whereby it is possible to obtain a molded product excellent in the impact strength.

Thus, the present invention provides a method for producing a molded heat-resistant resin product, which comprises injection-molding a thermoplastic resin (A) and a rubber-reinforced heat-resistant resin (B) having a high temperature side glass transition temperature, the difference of which from the high temperature side glass transition temperature of said thermoplastic resin (A) is within 60° C., simultaneously as they are.

Now, the present invention will be described in detail with reference to the preferred embodiments.

Firstly, the thermoplastic resin (A) to be used in the present invention, will be described.

For the purpose of the present invention, the thermoplastic resin (A) is a thermoplastic resin comprising a graft copolymer obtained by copolymerizing to a rubber-like polymer, a monomer mixture comprising an aromatic vinyl monomer, a vinyl cyanide monomer and optional other copolymerizable vinyl monomers, and a vinyl copolymer made of an aromatic vinyl monomer, a vinyl cyanide monomer and optional other polymerizable vinyl monomers. It is preferably a thermoplastic resin comprising a graft copolymer obtained by copolymerizing, to from 40 to 70 parts by weight of a rubber-like polymer, from 30 to 60 parts by weight of a monomer mixture comprising from 65 to 80 wt % of an aromatic vinyl monomer, from 20 to 35 wt % of a vinyl cyanide monomer and from 0 to 10 wt % of optional other copolymerizable vinyl monomers, and a vinyl copolymer made of from 65 to 80 wt % of an aromatic vinyl monomer, from 20 to 35 wt % of a vinyl cyanide monomer and from 0 to 10 wt % of optional other copolymerizable vinyl monomers.

The rubber-like polymer may, for example, be a butadiene polymer, a butadiene-styrene copolymer, an ethylene-propylene copolymer and ethylene-propylenediene copolymer or an acrylate polymer. These polymers may be used alone or in combination as a mixture.

The aromatic vinyl monomer may, for example, be styrene, α-methylstyrene, vinyl toluene, t-butylstyrene or chlorostyrene. Particularly preferred is styrene or α-methylstyrene.

The vinyl cyanide monomer may, for example, be acrylonitrile, methacrylonitrile or α-chloroacrylonitrile. Particularly preferred is acrylonitrile.

Other copolymerizable vinyl monomers which may optional be used as the case requires, include, for example, acrylate monomers such as methyl acrylate and ethyl acrylate; methacrylate monomers such as methyl methacrylate and ethyl methacrylate; vinyl carboxylic acid monomers such as acrylic acid and methacrylic acid; maleimide; N-alkyl maleimide monomers such as N-methylmaleimide, N-butylmaleimide and N-cylohexyl maleimide; N-arylmaleimide monomers such as N-phenylmaleimide, N-2-methylphenylmaleimide, N-4-methoxymaleimide and N-2-chlorophenylmaleimide; unsaturated dicarboxylic acid anhydrides such as maleic anhydride; and monomers such as acrylic acid and methacrylic acid. It is particularly preferred to employ a methacrylate.

Specific examples of the thermoplastic resin (A) to be used in the preset invention, include ABS resins such as ABS (acrylonitrile-butadiene-styrene) resin and heat-resistant ABS (acrylonitrile-butadiene-α-methylstyrene), AES (acrylonitrile-EPDM-styrene) resin, AAS (acrylonitrile-acrylate-styrene) resin, and MBS (methylmethacrylate-butadiene-styrene) resin. However, the thermoplastic resin (A) is not limited to such specific examples.

Now, the rubber-reinforced heat-resistant resin (B) to be used in the present invention will be described. The rubber-reinforced heat-resistant resin which may be used in the present invention, is required to be a resin which is miscible with the thermoplastic resin (A) used in the present invention and which has a glass transition temperature within 60° C. above the high temperature side glass transition temperature of the thermoplastic resin (A).

Such a heat-resistant resin may, for example, be an α-methylstyrene-acrylonitrile copolymer, a styrene-maleic anhydride copolymer or an aromatic vinyl-unsaturated dicarboxylic acid imide derivative copolymer. However, from the viewpoint of compatibility with the thermoplastic resin (A), it is preferably a copolymer made of from 65 to 80 wt % of α-methylstyrene, from 20 to 35 wt % of acrylonitrile and from 0 to 10 wt % of other copolymerizable vinyl monomers, a copolymer made of from 65 to 80 wt % of styrene, from 15 to 40 wt % of maleic anhydride and from 0 to 10 wt % of other copolymerizable vinyl monomers, or a copolymer made of from 40 to 75 wt % of an aromatic vinyl, from 25 to 60 wt % of an unsaturated dicarboxylic acid imide derivative and from 0 to 10 wt % of other copolymerizable vinyl monomers.

However, such a heat-resistant copolymer is essentially brittle when used alone. Accordingly, the larger the amount to be incorporated to the thermoplastic resin (A) is, the lower the strength of the molded product tends to be, whereby the practical usefulness will be lost. Accordingly, as a specific rubber-reinforced heat-resistant resin to be used in the present invention, it is necessary to preliminarily incorporate a component having a reinforcing effect to such a heat-resistant copolymer. Accordingly, a rubber-reinforced resin comprising a graft copolymer obtained by copolymerizing to a rubber-like polymer, a monomer mixture comprising an aromatic vinyl monomer, a vinyl cyanide monomer and optional other copolymerizable vinyl monomers, an optional vinyl copolymer made of an aromatic vinyl monomer, a vinyl cyanide monomer and optional other copolymerizable vinyl monomers, and the above mentioned heat-resistant copolymer, is preferably used as the rubber-reinforced heat-resistant resin (B) of the present invention. The proportion of the heat-resistant copolymer in the rubber-reinforced heat-resistant resin (B) is preferably from 50 to 80 wt %. Otherwise, it may be a resin having the above heat-resistant copolymer graft-polymerized directly to the rubber-like polymer during the polymerization of the heat-resistant copolymer. In this case, the rubber-like polymer is preferably from 10 to 20 wt %.

Particularly preferred is a resin comprising a heat-resistant copolymer composed of aromatic vinyl units, unsaturated dicarboxylic acid imide derivative units and optional other copolymerizable vinyl monomer units, and the above mentioned graft copolymer. Further, to such a resin a vinyl copolymer made of an aromatic vinyl monomer, a vinyl cyanide monomer and optional other copolymerizable vinyl monomers, may suitably be mixed.

As examples of the aromatic vinyl monomer, the vinyl cyanide monomer and said other copolymerizable vinyl monomers to be used for the heat-resistant copolymer, the graft copolymer and the vinyl copolymer, those mentioned in the description of the thermoplastic resin (A) may be mentioned. In particular, as the aromatic vinyl monomer, styrene is preferred, and as the vinyl cyanide monomer, acrylonitrile is preferred. As other copolymerizable vinyl monomers, for the heat-resistant copolymer composed of aromatic vinyl units and unsaturated dicarboxylic acid imide derivative units, acrylonitrile, a methacrylate and maleic anhydride may preferably be used, and for the graft copolymer and for the vinyl copolymer, a methacrylate may preferably be used. Further, the unsaturated dicarboxylic acid imide derivative may, for example, be an N-alkylmaleimide or an N-arylmaleimide as mentioned in the description of the thermoplastic resin (A), and particularly preferred is N-phenylmaleimide.

Further, in the rubber-reinforced heat-resistant resin (B) having the heat-resistant copolymer graft-polymerized directly to the rubber-like polymer, the rubber-like polymer to be used may be the one exemplified in the description of the thermoplastic resin (A).

Preferred as a specific example of the rubber-reinforced heat-resistant resin (B) is a rubber-reinforced resin of a styrene-N-phenylmaleimide copolymer comprising a styrene-N-phenylmaleimide copolymer, a styrene-N-phenylmaleimide-acrylonitrile copolymer or a styrene-N-phenylmaleimide-maleic anhydride copolymer, and the graft copolymer and an optional vinyl copolymer made of an aromatic vinyl monomer, a vinyl cyanide monomer and optional other copolymerizable vinyl monomers which may be used as the case requires to control the heat resistance, the fluidity and the strength.

The reason why such a heat-resistant copolymer obtaining an aromatic vinyl-unsaturated dicarboxylic acid imide derivative copolymer is suitable as the heat-resistant resin component for the rubber-reinforced resin of the present invention, is that in the copolymerization composition within a range which is miscible with the above mentioned thermoplastic resin (A), it has higher heat resistance, and accordingly a molded product having high heat resistance can be obtained by incorporating a less amount of the heat resistant copolymer to the thermoplastic resin (A), and the heat resistance can be varied within a wide range.

Further, the difference in the high temperature side glass transition temperature between the two resins i.e. between the rubber-reinforced heat-resistant resin (B) and the thermoplastic resin (A) of the present invention, is required to be not more than 60° C.

If the high temperature side glass transition temperature of the rubber-reinforced heat-resistant resin (B) is extremely high as compared with the high temperature side glass transition temperature of the thermoplastic resin (A), no adequate mixing in the injection molding machine can be attained, whereby the strength of the obtained molded product tends to be low. The blend ratio of the thermoplastic resin (A) and the rubber-reinforced heat-resistant resin (B) is not particularly limited, so long as it satisfies the difference in the glass transition temperature, and it is selected depending upon the desired physical properties such as heat resistance.

In a method of molding the thermoplastic resin (A) and the rubber-reinforced heat-resistant resin (B) by the same injection molding machine, the cylinder temperature for the injection molding machine is set at a level higher by at least about 100° C. than the high temperature side glass transition temperature of the rubber-reinforced heat-resistant resin (B), whereby a molded product excellent in the strength can be obtained.

As a method for supplying the thermoplastic resin (A) and the rubber-reinforced heat-resistant resin (B) to the injection molding machine, it is possible to employ a method of supplying their mixture pre-blended by a conventional apparatus such a tumbler mixer or a V blender, or a method of quantitatively supplying the two resins separately to the hopper of the injection molding machine. The supplying method is not particularly limited.

To the rubber-reinforced heat-resistant resin (B) of the present invention, an antioxidant, an ultraviolet absorber, a plasticizer, a lubricant or a coloring agent may be incorporated as the case requires. Further, such additives may be supplied simultaneously at the time of supplying the thermoplastic resin (A) and the rubber-reinforced heat-resistant resin (B) to the injection molding machine.

Now, the present invention will be described in further detail with reference to Examples. However, it is should be understood that the present invention is based on a concept that the thermoplastic resin (A) and the rubber-reinforced heat-resistant resin (B) having different heat resistance are directly injection-molded without necessity of being preliminarily kneaded, to obtain a molded product, and the concept itself is inventive. Accordingly, the present invention is by no means restricted by specific Examples. In the Examples, "parts" and "%" mean "parts by weight" and "% by weight".

Thermoplastic resin (A)

The compositional proportions of components and the physical property values i.e. the high temperature side glass transition temperature, the IZOD impact strength and the Vicat softening point, of the thermoplastic resin (A) used, are shown in Table 1. Commercially available ABS resin, AES resin and AAS resin pellets were used.

The compositional proportions of components in Table 1 are the proportions of monomer components as measured by pyrolysis gas chromatography. The nitrogen content was measured by a Kjeldahl method, and the acrylonitrile content was calculated, whereby the amount of the rubber-component was obtained as the residue. The glass transition temperature was measured by differential scanning calorimetry (DSC). The IZOD impact strength was measured in accordance with ASTM D256 with respect to a notched test specimen having a thickness of ¼ inch at a measuring temperature of 23° C. under a measuring humidity of 50% RH. The Vicat softening point was measured in accordance with JIS K7206 with respect to a test specimen having a thickness of ¼ inch under a load of 5 kg at a temperature raising rate of 50° C./hr.

TABLE 2

The compositional proportions of components of a raw material (No. 1) for rubber-reinforced heat-resistant resin and the weight average weight

| | Compositional proportions of components | Weight average molecular weight |
|---|---|---|
| SMI-1 | Copolymer of styrene 50% and N-phenylmaleimide 50% | 182000 |
| SMI-2 | Copolymer of styrene 50% and N-phenylmaleimide 35% and acrylonitrile 15% | 165000 |
| SMI-3 | Copolymer of styrene 47% and N-phenylmaleimide 51% and maleic anhydride 2% | 164000 |
| SMI-4 | Copolymer of styrene 50% and N-phenylmaleimide 50% | 81000 |
| HAS-1 | Copolymer of α-methylstyrene 74% and acrylonitrile 26% | 132000 |
| SMA-1 | Copolymer of styrene 75% and maleic anhydride 25% | 151000 |
| SMI-5 | Copolymer having styrene 52%, N-phenylmaleimide 15% and acrylonitrile 18% grafted to butadiene rubber 15% | 168000 |

Likewise, the compositional proportions of components of a raw material (No. 2: graft copolymer and vinyl copolymer) for the rubber-reinforced heat-resistant resin (B) used,

TABLE 1

The compositional proportions of components and the physical property values of thermoplastic resin (A)

| | | Compositional proportions of components | High temperature side glass transition temperature (°C.) | IZOD impact strength (kg-cm/cm) | Vicat softening point (°C.) |
|---|---|---|---|---|---|
| ABS | Rubber component | Butadiene rubber 18% | 104 | 25 | 95 |
| | Monomer component | Acrylonitrile 22% and styrene 60% | | | |
| AES | Rubber component | Ethylene-propylene rubber 19% | 105 | 36 | 97 |
| | Monomer component | Acrylonitrile 22% and styrene 59% | | | |
| AAS | Rubber component | n-butylacrylonitrilate rubber 17% and butadiene rubber 5% | 105 | 16 | 96 |
| | Monomer component | Acrylonitrile 21% and styrene 57% | | | |
| Heat resistant ABS | Rubber component | Butadiene rubber 18% | 123 | 20 | 110 |
| | Monomer component | Acrylonitrile 22%, styrene 21%, α-methylstyrene 37% and methylmethacrylate 2% | | | |

Rubber-reinforced heat-resistant resin (B)

The compositional proportions of components of a raw material (No. 1: heat-resistant copolymer) for the rubber reinforced heat-resistant resin (B) used, and the weight average molecular weight thereof as measured by gel permeation chromatography (GPC) are shown in Table 2. By GPC, a calibration curve was prepared by using polystyrenes having standard molecular weights, and a weight average molecular weight was obtained as calculated as polystyrene.

the graft ratio thereof and the weight average molecular weight of the non-grafted copolymer are shown in Table 3.

These values were obtained in such a manner that a sample in a predetermined amount was swelled in a methyl ethyl ketone (MEK) solvent and centrifugally separated, whereupon the supernatant solution was taken as a non-grafted copolymer. The weight average molecular weight was measured by GPC, and the compositional analysis was conducted by the quantitative analysis of nitrogen by a Kjeldahl method. Further, using the MEK-insoluble content precipitated by centrifugal separation, the amount of the rubber component was determined by a halogen addition method, and the graft ratio was obtained by the following formula (1). Further, the ratio of butadiene rubber and styrene-butadiene rubber was assumed to be the same ratio as charged for the preparation.

$$\text{Graft ratio} = \left| \frac{\text{Weight of MEK-insoluble content}}{\text{Weight of rubber content}} - 1 \right| \times 100(\%) \quad (1)$$

TABLE 3

The compositional proportions of components of a raw material (No. 2) for rubber-reinforced heat-resistant resin, the graft ratio and the weight average molecular weight

| | Compositional proportions of components | Graft ratio | Weight average molecular weight of non-grafted copolymer |
|---|---|---|---|
| G-1 | butadiene rubber 40% styrene 43.8%, acrylonitrile 16.2% | 42% | 89000 |
| G-2 | butadiene rubber 40%, styrene-butadiene rubber 10% styrene 37%, acrylonitrile 13% | 56% | 125000 |
| AS-1 | styrene 75%, acrylonitrile 25% | — | 128000 |

The raw materials for rubber reinforced heat-resistant resin as identified in Tables 2 and 3 were kneaded and mixed in the proportions as identified in Table 4 by means of a twin screw extruder with the same rotational direction (TEM-50B manufactured by Toshiba Kikai, L/D=25.2, cylinder temperature: 280° C., screw rotational speed: 200 rpm, feeding amount: 200 kg/hr) to obtain rubber-reinforced heat-resistant resin pellets.

The high temperature side glass transition temperature of the obtained rubber-reinforced heat-resistant resin as measured by DSC is shown in Table 4.

TABLE 4

The blend compositional proportions and the high temperature side glass transition temperature of rubber reinforced heat-resistant resin (B)

| | Blend compositional proportions | | | High temperature side glass transition temperature |
|---|---|---|---|---|
| MB-1 | SMI-1 | 60% | G-1 40% | 156° C. |
| MB-2 | SMI-2 | 70% | G-2 30% | 144° C. |
| MB-3 | SMI-3 | 60% | G-1 40% | 157° C. |
| MB-4 | SMI-4 | 60% | G-1 40% | 154° C. |
| MB-5 | HAS-1 | 70% | G-2 30% | 135° C. |
| MB-6 | SMA-1 | 70% | G-2 30% | 133° C. |
| MB-7 | SMI-1 AS-1 | 60% 10% | G-1 30% | 154° C. |
| MB-8 | SMI-3 | 60% | G-2 40% | 160° C. |
| MB-9 | SMI-1 | 80% | G-2 20% | 178° C. |
| MB-10 | SMI-1 | 90% | G-2 10% | 186° C. |
| MB-11 | SMI-5 | 100% | | 134° C. |

EXAMPLES 1 TO 15

The thermoplastic resin (A) and the rubber-reinforced heat-resistant resin (B) were injection-molded in the blend proportions as identified in Table 5 or 6, and the results of the IZOD impact strength and the Vicat softening point were also shown. The thermoplastic resin (A) was dried at 80° C. for 3 hours, and the rubber-reinforced heat-resistant resin (B) was dried at 110° C. for 3 hours. Then, the thermoplastic resin (A) and the rubber-reinforced heat-resistant resin (B) were mixed for 5 minutes by a tumbler mixer in the proportions as identified in the Table and then supplied to an injection molding machine. The injection molding machine was IS-50EP, manufactured by Toshiba Kikai, and the molding conditions were as follows.

Cylinder temperature: 280° C.

Injection pressure: minimum filling pressure+5 kg/cm²G

Injection rate: 70%

Mold temperature: 60° C.

Screw: full flight screw

The conditions for measuring the physical properties were as follows.

The IZOD impact strength was measured in accordance with ASTM D256 with respect to a notched test specimen having a thickness of ¼ inch at a measuring temperature of 23° C. under a measuring humidity of 50%/RH.

The Vicat softening point was measured in accordance with JIS K7206 with respect to a test specimen having a thickness of ¼ inch under a load of 5 kg at a temperature raising rate of 50° C./hr.

TABLE 5

| | | Examples 1 to 8 | | | | | | | |
|---|---|---|---|---|---|---|---|---|---|
| | | Example 1 | Example 2 | Example 3 | Example 4 | Example 5 | Example 6 | Example 7 | Example 8 |
| Blend proportions | MB-1 | 25 | 25 | 25 | 25 | | | | |
| | MB-2 | | | | | 25 | | | |
| | MB-3 | | | | | | 10 | 25 | 40 |

TABLE 5-continued

| | | Examples 1 to 8 | | | | | | | |
|---|---|---|---|---|---|---|---|---|---|
| | | Example 1 | Example 2 | Example 3 | Example 4 | Example 5 | Example 6 | Example 7 | Example 8 |
| | ABS | 75 | | | | 75 | 90 | 75 | 60 |
| | AES | | 75 | | | | | | |
| | AAS | | | 75 | | | | | |
| | Heat resistant ABS | | | | 75 | | | | |
| IZOD impact strength (kg-cm/cm) | | 21 | 32 | 13 | 16 | 22 | 24 | 22 | 17 |
| Vicat softening point (°C.) | | 110 | 111 | 111 | 122 | 108 | 102 | 111 | 120 |

TABLE 6

| | | Examples 9 to 15 | | | | | | |
|---|---|---|---|---|---|---|---|---|
| | | Example 9 | Example 10 | Example 11 | Example 12 | Example 13 | Example 14 | Example 15 |
| Blend proportions | MB-4 | 25 | | | | | | |
| | MB-5 | | 40 | | | | | |
| | MB-6 | | | 40 | | | | |
| | MB-7 | | | | 25 | | | |
| | MB-8 | | | | | 25 | | |
| | MB-9 | | | | | | 25 | |
| | MB-11 | | | | | | | 40 |
| | ABS | 75 | 60 | 60 | 75 | 75 | | 60 |
| | Heat resistant ABS | | | | | | 75 | |
| IZOD impact strength (kg-cm/cm) | | 20 | 22 | 20 | 21 | 22 | 14 | 20 |
| Vicat softening point (°C.) | | 109 | 106 | 105 | 111 | 112 | 125 | 110 |

COMPARATIVE EXAMPLES 1 TO 5

ABS resin as the thermoplastic resin (A) and the rubber-reinforced heat-resistant resin (B) was injection-molded in the blend proportions as identified in Table 7 for the purpose of comparison, and the results of the IZOD impact strength and the Vicat softening point were also shown. The drying conditions for the ABS resin and the rubber-reinforced heat-resistant resin (B), the mixing machine, the mixing conditions, the injection molding machine, the molding conditions, and the conditions for measuring the physical properties were the same as the preceding Examples.

COMPARATIVE EXAMPLES 6 TO 10

Using the thermoplastic resin (A) as identified in Table-1 and the raw materials for the rubber-reinforced heat-resistant resin as identified in Tables 2 and 3, resin pellets were prepared by kneading and mixing in the proportions as identified in Table 8 by means of a twin screw extruder with the same rotational direction. The resin pellets were injection-molded to obtain a test specimen, and the physical properties of the test specimen are shown also in Table 8 as Comparative Examples. The twin extruder was TEM-50B (L/D=25.2) manufactured by Toshiba Kikai, and kneading and mixing were carried out at a cylinder temperature of 280° C. at a screw rotational speed of 250 rpm at a feeding rate of 120 kg/hr to obtain pellets. The injection molding machine for the test specimen, the molding conditions and the method for measuring the physical properties were the same as in the preceding Examples. The pellets were dried at 100° C. for 3 hours.

TABLE 7

| | | Comparative Examples 1 to 5 | | | | |
|---|---|---|---|---|---|---|
| | | Comparative Example 1 | Comparative Example 2 | Comparative Example 3 | Comparative Example 4 | Comparative Example 5 |
| Blend proportions | MB-9 | 25 | | | | |
| | MB-10 | | 25 | | | |
| | SMI-1 | | | 15 | | |
| | HAS-1 | | | | 28 | |
| | SMA-1 | | | | | 28 |
| | ABS | 75 | 75 | 85 | 72 | 72 |
| IZOD impact strength (kg-cm/cm) | | 10 | 8 | 5 | 6 | 5 |
| Vicat softening point (°C.) | | 111 | 114 | 103 | 103 | 102 |

TABLE 8

| | | Comparative Examples 6 to 10 | | | | |
|---|---|---|---|---|---|---|
| | | Comparative Example 6 | Comparative Example 7 | Comparative Example 8 | Comparative Example 9 | Comparative Example 10 |
| Blend proportions | SMI-1 | 15 | 15 | 15 | 15 | 15 |
| | G-1 | 10 | 10 | 10 | 10 | 45 |
| | AS-1 | | | | | 40 |
| | ABS | 75 | | | | |
| | AES | | 75 | | | |
| | AAS | | | 75 | | |
| | heat resistant ABS | | | | 75 | |
| IZOD impact strength (kg-cm/cm) | | 18 | 28 | 11 | 12 | 19 |
| Vicat softening point (°C.) | | 109 | 111 | 111 | 121 | 109 |

EXAMPLE 16 AND COMPARATIVE EXAMPLES 11 AND 12

With a blend as identified in Table 9, a box-shaped molded product having a length of 256.1 mm, a width of 165.9 mm, a depth of 72.5 mm and a wall thickness of 2.0 mm was injection-molded by means of an injection molding machine K-125, manufactured by Kawaguchi Tekkou K.K. As the gate for this molded product, a direct gate was provided at the center of the bottom surface. The molding conditions were as shown below. The drying of pellets was carried out at 80° C. for 3 hours for the ABS resin in Example 16 and Comparative Example 11 and at 110° C. for 3 hours for the rubber-reinforced heat-resistant resin (B). The pellets in Comparative Example 12 were dried at 100° C. for 3 hours.

Cylinder temperature;: 260° C.

Injection pressure: minimum filling pressure+5 kg/cm$^2$G

Injection rate: 70%

Mold temperature: 60° C.

Screw: full flight screw

Using this box-shaped molded product, a heat-resistance test and a drop-weight impact test were conducted, and the results are shown in Table 9. In the heat-resistance test, the molded product was left in oven of 105° C. for 2 hours, then taken out and left to cool to 23° for 24 hours in an atmosphere of 50% RH, whereupon the average dimensional changes at the center portions of the length and the width were measured. In the drop-weight impact test, the length side, the width side and the bottom side were cut out, and a weight of 1 kg was dropped thereon, and the height at 50% breakage was measured.

TABLE 9

| Example 16 and Comparative Examples 11 and 12 | | | | |
|---|---|---|---|---|
| | | Example 16 | Comparative Example 11 | Comparative Example 12 |
| Blend proportions | MB-1 | 25 | | Pellets of Comparative Example 6 were used |
| | MB-10 | | 25 | |
| | ABS | 75 | 75 | |
| | AAS | | | |
| | Heat resistant ABS | | | |
| Heat resistant dimensional change (%) | | 0.1 | 0.3 | 0.1 |
| Drop-weight impact strength (cm) | Length side | 130 | 10 | 110 |
| | Width side | 130 | 10 | 120 |

TABLE 9-continued

| Example 16 and Comparative Examples 11 and 12 | | | |
|---|---|---|---|
| | Example 16 | Comparative Example 11 | Comparative Example 12 |
| Bottom side | 80 | <5 | 60 |

EXAMPLE 17

Example 17 will be described. To 100 parts of a resin comprising 60% of SMI-1 and 40% of G-1, 2 parts of carbon black was blended, and the blend was kneaded and mixed by a twin screw extruder with the same rotational direction to obtain a black colored rubber-reinforced heat-resistant resin (B). The conditions for kneading and mixing were the same as in the preparation of MB-1. This rubber-reinforced heat-resistant resin (B) and ABS resin were dried at 110° C. for 3 hours, and at 80° C. for 3 hours, respectively. Then, they were mixed for 5 minutes by a tumbler in a ratio of 25/75 and then injection-molded into a meter hood for an automobile (weight of the molded product: about 500 g) by an injection molding machine 550MG, manufactured by Mitsubishi Heavy Industries Co., Ltd. The molding conditions were as follows.

Cylinder temperature: 260° C.

Injection pressure: minimum filling pressure+5 kg/cm$^2$G

Injection rate: 70%

Mold temperature: 60° C.

Screw: full flight screw

No defects on appearance such as color irregularities, flushes, silver streaks or peeling of the surface layer, were observed.

It is evident that in Examples 1 to 15 of the present invention, the heat resistance was improved while the impact strength of the thermoplastic resin (A) was not substantially decreased.

Example 9 was better in the moldability than Example 1, with the minimum filling pressure at the time of the injection molding was lower by 10 kg/cm$^2$G. Further, Example 14 indicates that MB-9 has a high glass transition temperature, and it can not be used for ABS resin, but is useful for heat resistant ABS resin.

In Comparative Examples 1 and 2, the rubber-reinforced heat-resistant resins MB-9 and MB-10 used had high temperature side glass transition temperatures higher by more than 60° C. than ABS resin, whereby the impact strength was inferior.

In Comparative Examples 3, 4 and 5, the heat-resistant copolymers SMI-1, HAS-1 and SMA-1 used, contained no rubber component, whereby the impact strength was poor. Further, no adequate uniformity could be attained in the injection molding machine, whereby the heat resistance was also poor.

In Comparative Examples 6 and 10, the compositions are comparative to Example 1. However, these Comparative Examples were inferior in the impact strength to Example 1.

Comparative Examples 7, 8 and 9 were comparative to Examples 2, 3 and 4 in their compositions. However, these Comparative Examples were inferior in the impact strength to the Examples.

As compared with Comparative Example 11, Example 16 is superior in the heat resistance and the drop-weight impact strength. Further, as compared with Comparative Example 12, it is superior in the drop-weight impact strength.

According to the method of the present invention, a molded heat-resistant resin product excellent in the heat-resistance and the impact strength can be obtained economically advantageously, and the method is applicable to the production of injection molded parts in various fields, such as automobile parts, electric and electronic parts, household electric parts and sundries for which heat-resistant ABS resin has been heretofore employed.

We claim:

1. A method for producing a molded heat-resistant resin product, which comprises injection-molding without prior kneading of a thermoplastic resin (A) and a rubber-reinforced heat-resistant resin (B) wherein the highest glass transition temperature component of said rubber-reinforced heat-resistant resin (B) has a glass transition temperature within 60° C. above the glass transition temperature of the highest glass transition temperature component of said thermoplastic resin (A), and wherein said thermoplastic resin (A) is a resin comprising (1) a graft copolymer obtained by graft copolymerizing to a rubber polymer, a monomer mixture (i) comprising an aromatic vinyl monomer, a vinyl cyanide monomer and optionally other copolymerizable vinyl monomers, and (2) a copolymer made from said monomer mixture (i); and the rubber-reinforced heat-resistant resin (B) is a preformed resin comprising (1) a copolymer composed of aromatic vinyl units, unsaturated dicarboxylic acid imide derivative units and/or other copolymerizable vinyl monomer units, (2) a graft copolymer obtained by graft copolymerizing to a rubber polymer, a monomer mixture comprising an aromatic vinyl monomer, a vinyl cyanide monomer and optionally other copolymerizable vinyl monomers, and optionally (3) a vinyl copolymer made of an aromatic vinyl monomer, a vinyl cyanide monomer and optionally other copolymerizable vinyl monomers.

2. The method for producing a molded heat-resistant resin product according to claim 1, wherein the thermoplastic resin (A) is a resin comprising (1) a graft copolymer obtained by graft copolymerizing, to from 40 to 70 parts by weight of a rubber polymer, from 30 to 60 parts by weight of a monomer mixture (i) comprising from 65 to 80 wt % of an aromatic vinyl monomer, from 20 to 35 wt % of a vinyl cyanide monomer and from 0 to 10 wt % of optionally other copolymerizable vinyl monomers, and (2) a vinyl copolymer made of said monomer mixture (i); and the rubber-reinforced heat-resistant resin (B) is a rubber-reinforced resin comprising (1) at least one heat-resistant copolymer selected from the group consisting of (a) a copolymer made of from 65 to 80 wt % of α-methylstyrene, from 20 to 35 wt % of acrylonitrile and from 0 to 10 wt % of other copolymerizable vinyl monomers, (b) a copolymer made of from 65 to 80 wt % of styrene, from 15 to 40 wt % of maleic anhydride and from 0 to 10 wt % of other copolymerizable vinyl monomers, and (c) a copolymer made of from 40 to 75 wt % of an aromatic vinyl monomer, from 25 to 60 wt % of an unsaturated dicarboxylic imide derivative and from 0 to 10 wt % of other copolymerizable vinyl monomers, and (2) a graft copolymer obtained by graft copolymerizing to a rubber polymer, a monomer mixture comprising an aromatic vinyl monomer, a vinyl cyanide monomer and optionally other copolymerizable vinyl monomers, and optionally (3) a vinyl copolymer made of an aromatic vinyl monomer, a vinyl cyanide monomer and optionally other copolymerizable vinyl monomers, wherein the proportion of the heat-resistant copolymer in said rubber-reinforced heat-resistant resin (B) is from 50 to 80 wt %, and the rubber polymer is from 10 to 20 wt %.

3. The method for producing a molded heat-resistant resin product according to claim 1, wherein the thermoplastic resin (A) is at least one member selected from the group consisting of ABS resin, heat-resistant ABS resin, and AAS resin, and the rubber-reinforced heat-resistant resin (B) comprises at least one member selected from the group consisting of a styrene-N-phenylmaleimide copolymer, a styrene-N-phenylmaleimideacrylonitrile copolymer, a styrene-N-phenylmaleimidemaleic anhydride copolymer, an α-methylstyreneacrylonitrle copolymer and a styrene-maleic anhydride copolymer, and a graft copolymer obtained by copolymerizing styrene and acrylonitrile to a rubber polymer.

4. A molded heat-resistant resin product made by the method of claim 1.

* * * * *